Aug. 2, 1966     H. J. BROWN     3,263,563
FLARE IGNITION DEVICE
Filed Sept. 23, 1964     2 Sheets-Sheet 1
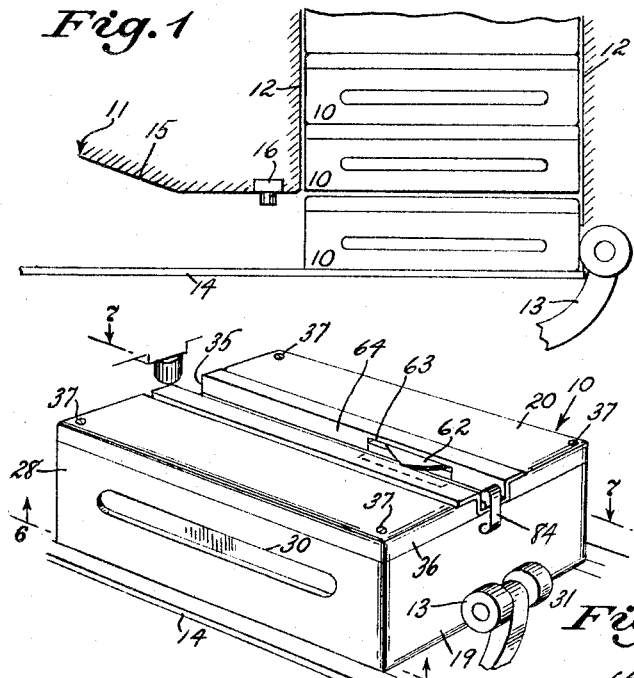
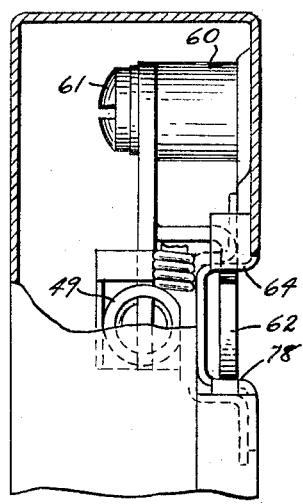
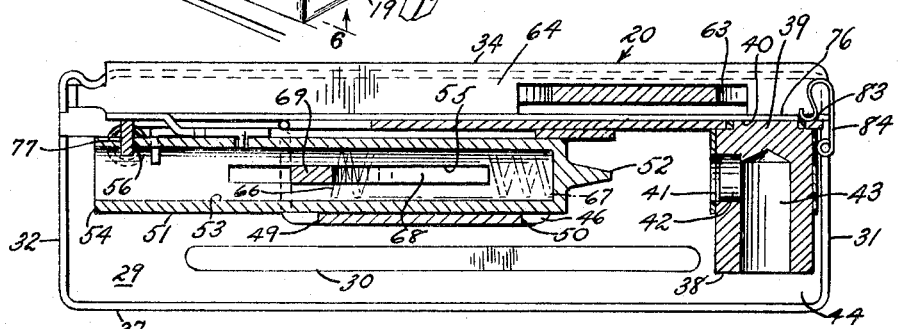
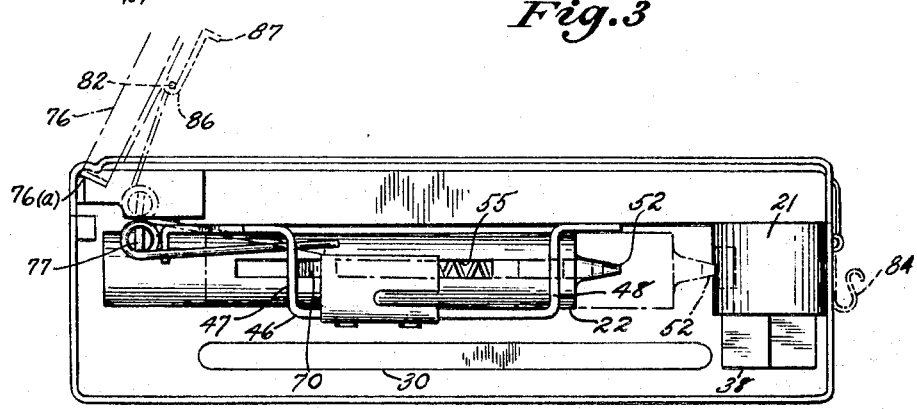

United States Patent Office 3,263,563
Patented August 2, 1966

1

3,263,563
FLARE IGNITION DEVICE
Harvey J. Brown, Huntington, N.Y., assignor to Lundy
Electronics and Systems, Inc., Nassau, New York
Filed Sept. 23, 1964, Ser. No. 398,493
10 Claims. (Cl. 89—1.5)

This invention relates generally to the field of flares adapted to be dispensed by an aircraft in flight, and more particularly to an ignition device exhibiting safety mechanisms for preventing accidential ignition of the flare prior to separation from the aircraft.

With the development of anti-aircraft missiles of the heat-sensing type, there has arisen a need for an anti-missile countermeasure which will serve to deflect the paths of the missile from the aircraft, and explode the same at a harmless distance therefrom. Since such anti-aircraft missiles seek the heat from the exhaust of the plane, an effective countermeasure lies in the provision of a flare-type device capable of generating, for a relatively short period of time, a degree of heat somewhat greater than that of the exhaust of the aircraft. Such flares, when discharged over a suitable time interval (for example, ten seconds), will provide a sufficient number of heated areas to which the missiles will home for a period of time sufficient to allow the aircraft to leave the effective range of the missiles.

Obviously, flares of this type must generate over a very short period of time, e.g. five or six seconds, a large quantity of heat, in the order of over one-half million watts. The amount of burning material necessary to generate this heat is correspondingly extremely dangerous, and if accidentally ignited prior to ejection from the aircraft, such a flare is capable of destroying the entire aircraft during its own combustion. Since such a countermeasure requires the storage of substantial quantities of such flares within the aircraft during flight, it is absolutely essential that the construction of the flare be such that accidental ignition is impossible.

It is therefore among the principal objects of the present invention to provide an improved flare ignition system employing conventional-type firing pin and percussion cap elements in which the firing pin is maintained in an uncocked condition at all times prior to the commencement of the ejection of the flare from the aircraft.

Another object of the invention lies in the provision of an improved flare ignition mechanism in which the movement of the flare along an ejection chute serves to successively cock the ignition mechanism for subsequent firing, the cocking action, of itself, unlocking a firing pin-retaining bar which is subsequently released as soon as the flare has passed down the chute to the point of ejection.

Yet another object of the invention lies in the provision of an improved flare ignition device having auxiliary safety means released after the cocking function has been accomplished but before the flare has left the dispensing chute, whereby failure of a previously released safety device at any time prior to discharge of the flare will not ignite the same accidentally.

A feature of the invention lies in the fact that the firing pin spring is not subject to compression during periods of storage, or at any time prior to the commencement of an ejecting cycle, whereby the firing pin spring has not occasion to become fatigued prior to use. The

2 spring is also normally not in condition whereby accidental operation of the trip mechanism can cause firing.

Another feature of the invention lies in the fact that since the ignition means is wholly contained within an individual flare, the failure of one of a series of flares to ignite during serial discharge has no effect on the operation of succeeding flares.

These objects and features, as well as other incidental ends and advantages, will more fully appear in the progress of the following disclosure, and be pointed out in the appended claims.

In the drawings, to which reference will be made in the specification, similar reference characters have been employed to designate corresponding parts throughout the several views.

FIGURE 1 is a schematic view of a flare-dispensing chute in association with a magazine forming a part of an embodiment of the invention.

FIGURE 2 is a fragmentary view in perspective showing a flare in position within a dispensing chute, and just prior to activation for discharge.

FIGURE 3 is an enlarged longitudinal central sectional view of an individual flare.

FIGURE 4 is an enlarged longitudinal sectional view corresponding to that seen in FIGURE 3, but showing certain of the component parts in altered relative position.

FIGURE 5 is a fragmentary enlarged end elevational view, partly broken away to show detail.

Figure 6:
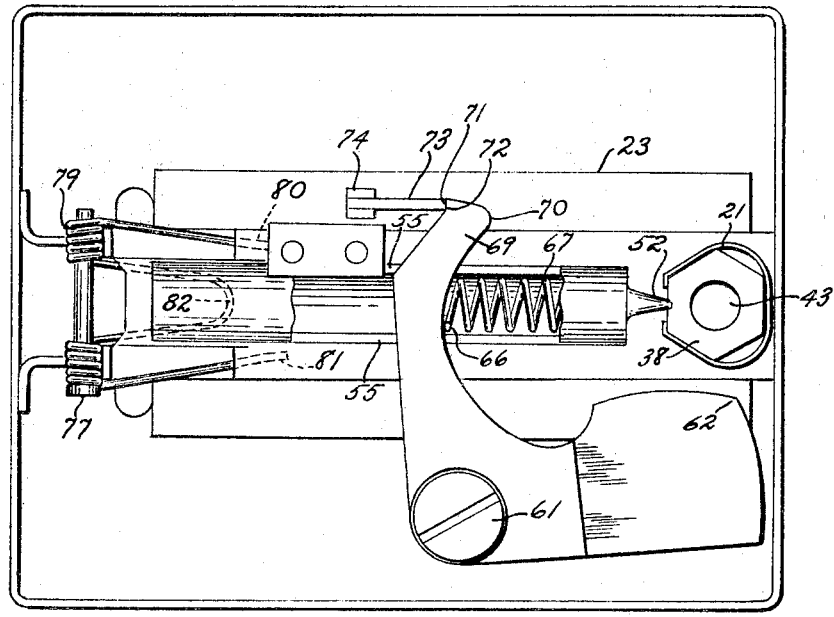
FIGURE 6 is a fragmentary bottom plan view, with certain of the component parts removed to show detail.

In accordance with the invention, the device, generally indicated by reference character 10, is illustrated in FIGURE 1 of the drawings in association with a dispensing chute element 11 which serially receives a plurality of devices from a magazine 12. Each device 10 is advanced by powered rollers 13 activated by means (not shown) under the control of the pilot of an aircraft, or other personnel. The chute element 11 includes a bottom wall 14, an upper wall 15, and may include optional side walls (not shown). An operating button 16 projects transversely into the opening in the chute, in such manner that relative motion between the device 10 and the chute 11 causes activation of the device, as will more fully appear hereinafter.

The device 10 includes a casing element 19 and corresponding lid element 20, which may be suitably formed by die casting, stamping, or molding from suitable material. Disposed within the casing element 19 are percussion ignition means 21, a striker mechanism 22, and striker-actuating means 23.

The casing element 19 is preferably of rectangular configuration, in order that the same may maintain proper orientation within the magazine 12, and includes a bottom wall 27, side walls 28 and 29, each of which is provided with an opening 30, and end walls 31 and 32. The lid element 20 includes an upper wall 34 having a longitudinal groove 35 extending the length thereof, the wall 34 being surrounded by a peripheral rim 36. The lid element 20 is interconnected with the casing element 19, preferably by screw means 37.

The percussion ignition means 21 may be of a conventional type, including a tubular member 38, the upper end 39 of which is secured to the lower surface 40 of the lid element. The tubular member 38 includes a first bore 41 having means for retaining a percussion cap 42. The bore 41 communicates with a second bore 43 positioned to feed the flame developed by the percussion cap 42 to the interior cavity 44 which is filled with a pressed cake (not shown) of burning material.

The striker mechanism 22 includes a supporting frame 46 also secured to the lower surface 40 of the lid element, the end walls 47 and 48 of which are provided with coaxially aligned circular openings 49 and 50 which support the firing pin 51 for movement along its principal axis. The pin 51 includes a pointed end 52 adapted to strike the cap 42, and a hollow bore 53 communicating with a rear end 54. Axially disposed and communicating with the bore 53 are a pair of longitudinal slots 55, and a pair of transverse grooves 56.

Figure 7:
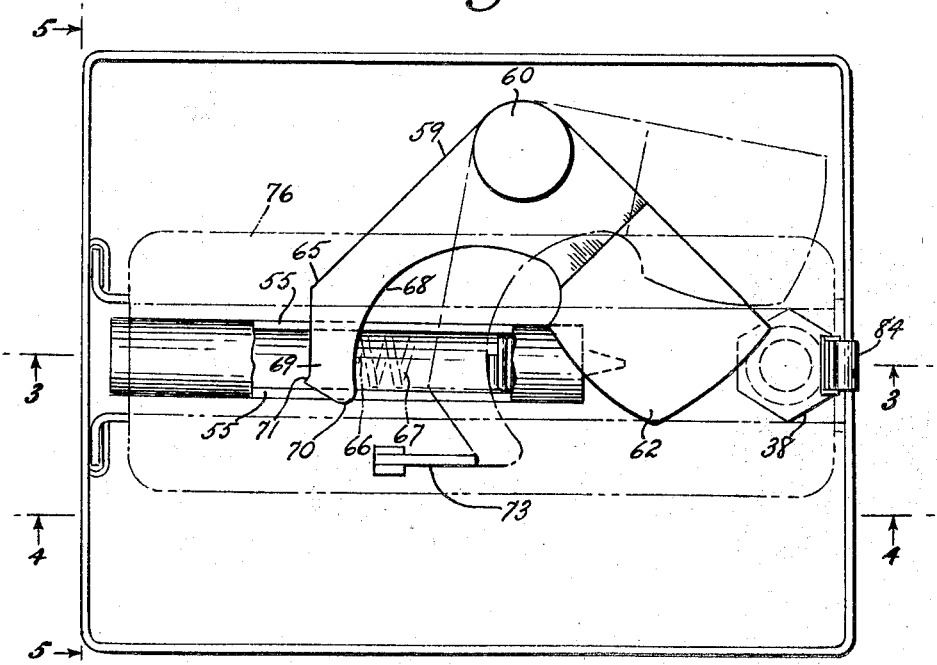
FIGURE 7 is a top plan view, with certain of the parts removed to show detail.

Referring to FIGURES 6 and 7, the striker-actuating means 23 includes a pivotally mounted cocking element 59 mounted on a boss 60 and maintained in position for movement by a screw 61. The cocking element 59 includes a button-engaging member 62 adapted to be selectively contacted by the button 16 during ejection of the device 10. The member 62 projects through an elongated slot 63 in a side wall 64 of the groove 35. The element 59 is mounted to form a first class lever, the oppositely disposed end of which forms a firing pin-engaging member 65 which is at all times disposed within the longitudinal grooves 55 of the pin 51. The member 65 contacts the rearward end 66 of the firing pin spring 67 at a curved engaging surface 68 thereof. The free end 69 includes a camming surface 70 and a locking surface 71 which are successively engageable with a cocking lever locking member 73 fixed to the lid element 20 by means of a bracket 74. As shown in FIGURES 6 and 7, the locking surface 71 is engaged within a groove 72, the free end of the member 73 having been previously cammed by the surface 70 to permit the locking surface 71 to penetrate the groove 72 and be retained thereby.

As best seen in FIGURES 2 to 4, inclusive, a firing pin release bar 76 is supported at a pivot point 76a for pivotal movement into and out of groove 35. Surrounding and supporting the cross bar 77 is a spring 79 the ends 80 and 81 of which are fixed with respect to the casing element, and a looped central portion 82 of which bears on the other surface of the bar 76 to urge the same outwardly when the bar is otherwise released. The free end 83 of the bar 76 is maintained in the position shown in FIGURE 2 by a resilient safety catch 84 which lies in the path of relative movement between the device 10 and the button 16.

During operation, upon proper signal, the lowermost device 10 disposed in the chute element is moved leftwardly as seen in FIGURE 1 by the powered rollers 13. While disposed in the magazine 12, the devices 10 are in uncocked condition, and the bar 76 is maintained within the groove 35. As the device 10 approaches the end of the chute element 11, which is near the point of discharge, the button 16 first contacts the button-engaging member 62 of the cocking element 59 to move the same from the position shown in full lines in FIGURE 7 to the position shown in dashed lines. This movement results in the free end 69 contacting the locking member 73, and camming the same sufficiently to allow the free end to enter the groove 72 to be locked thereby. As the firing pin is still locked at this point, the movement of the cocking element will result in placing the firing pin spring under compression, as illustrated in both FIGURES 6 and 7. At this point, the button-engaging member 62, which has been previously positioned above the bar 76 to prevent movement thereof, has now been moved clear of the path of movement of the bar 76, but the bar is still maintained immovable by the safety catch 84 which has not as yet been engaged. As the device 10 continues its movement leftwardly as seen in FIGURE 1, the catch 84 is disengaged by the button 16, and moves from the position seen in FIGURE 3 to the position seen in FIGURE 4. The bar 76 is finally released as the device leaves the presence of the upper wall 15 of the chute, whereafter the spring 79 swings the bar 76 90° about the pivot 76a, as seen in FIGURE 3. This movement results in the withdrawal of the cross bar 77 from the groove 56 in the pin 51 by action of the tang 86 lifting the spring loop 82. The auxiliary firing pin lock 87 being a part of the tang is also withdrawn from a groove in the pin 51 and now proceeds under the impetus of the firing pin spring 67 to strike or pierce the percussion cap 42 and ignite the contents of the flare.

From a consideration of the above-described mode of operation, it will be apparent that the bar 76 is locked by a plurality of means in inactive condition during storage. Additionally, while being stored, there is present a positive obstacle between the firing pin and the percussion cap by virtue of the bar being locked. These obstacles, cross bar 77 and auxiliary firing pin lock 87, also provide positive means to prevent movement of the firing pin after the firing pin spring is compressed. By virtue of the fact that the two means are moved out of the path of travel of the pin only after device 10 separates from chute 11, maximum safety from premature ignition is thus provided.

It is to be understood that it is not considered that the invention is limited to the specific details of structure shown and set forth in this specification, for obvious modifications will occur to those skilled in the art to which the invention pertains.

What is claimed is:

1. In a self-contained ignitable flare including a casing element, and ignition means disposed within said casing element, the improvement comprising: a supporting frame, a firing pin having a principal axis and slidably mounted by said frame for movement along said axis, firing pin spring means for imparting said movement, a cocking element pivotally mounted upon said casing element for movement between first and second positions, a firing pin release bar pivotally mounted externally of said casing element for movement between first and second positions thereof, said bar having means thereon engaging said firing pin to lock the same against movement when said bar is in said first position, resilient means urging said bar to said second position thereof in which said firing pin is released for movement, said cocking element in said first position overlying said bar to maintain the same in said first position thereof and in a second position moving out of engagement with said bar and compressing said firing pin spring means.

2. In a self-contained ignitable flare including a casing element, and ignition means disposed within said casing element, the improvement comprising: a supporting frame, a firing pin having a principal axis and slidably mounted by said frame for movement along said axis, firing pin spring means for imparting said movement, a cocking element pivotally mounted upon said casing element for movement between first and second positions, a firing pin release bar pivotally mounted externally of said casing element for movement between first and second positions thereof, said bar having means thereon engaging said firing pin to lock the same against movement when said bar is in said first position, resilient means urging said bar to said second position thereof in which said firing pin is released for movement, said cocking element in said first position overlying said bar to maintain the same in said first position thereof and in a second position moving out of engagement with said bar and compressing said firing pin spring means; and detent means for retaining said cocking element in said second position.

3. In a self-contained ignitable flare including a casing element, and ignition means disposed within said casing element, the improvement comprising: a supporting frame, a firing pin having a principal axis and slidably mounted by said frame for movement along said axis, firing pin spring means for imparting said movement, a cocking element pivotally mounted upon said casing element for movement between first and second positions, a firing pin release bar pivotally mounted externally of said casing element for movement between first and second positions thereof, said bar having means thereon engaging said firing pin to lock the same against movement when said bar is in said first position, resilient means urging said bar to said second position thereof in which said firing pin is released for movement, said cocking element in said first position overlying said bar to maintain the same in said first position thereof and in a second position moving out of engagement with said bar and compressing said firing pin spring means; detent means for retaining said cocking element in said second position; and auxiliary means for retaining said bar in said first position thereof irrespective of the position of said cocking element.

4. In a self-contained ignitable flare including a casing element, and ignition means disposed within said casing element, the improvement comprising: a supporting frame, a firing pin having a principal axis and slidably mounted by said frame for movement along said axis, firing pin spring means for imparting said movement, a cocking element pivotally mounted upon said casing element for movement between first and second positions, a firing pin release bar pivotally mounted externally of said casing element for movement between first and second positions thereof, said bar having means thereon engaging said firing pin to lock the same against movement when said bar is in said first position, means urging said bar to said second position thereof in which said firing pin is released for movement, said cocking element in said first position overlying said bar to maintain the same in said first position thereof and in a second position moving out of engagement with said bar and compressing said firing pin spring means.

5. In a self-contained ignitable flare including a casing element, and ignition means disposed within said casing element, the improvement comprising: a supporting frame, a firing pin having a principal axis and slidably mounted by said frame for movement along said axis, firing pin spring means for imparting said movement, a cocking element pivotally mounted upon said casing element for movement between first and second positions, a firing pin release bar pivotally mounted externally of said casing element for movement between first and second positions thereof, said bar having means thereon engaging said firing pin to lock the same against movement when said bar is in said first position, means urging said bar to said second position thereof in which said firing pin is released for movement, said cocking element in said first position overlying said bar to maintain the same in said first position thereof and in a second position moving out of engagement with said bar and compressing said firing pin spring means; and detent means for retaining said cocking element in said second position.

6. In a self-contained ignitable flare including a casing element, and ignition means disposed within said casing element, the improvement comprising: a supporting frame, a firing pin having a principal axis and slidably mounted by said frame for movement along said axis, firing pin spring means for imparting said movement, a clocking element pivotally mounted upon said casing element for movement between first and second positions, a firing pin release bar pivotally mounted externally of said casing element for movement between first and second positions thereof, said bar having means thereon engaging said firing pin to lock the same against movement when said bar is in said first position, means urging said bar to said second position thereof in which said firing pin is released for movement, said cocking element in said first position overlying said bar to maintain the same in said first position thereof and in a second position moving out of engagement with said bar and compressing said firing pin spring means; detent means for retaining said cocking element in said second position; and auxiliary means for retaining said bar in said first position thereof irrespective of the position of said cocking element.

7. In combination, an ignitable flare and a dispensing chute therefor, said chute having a through bore corresponding in size and configuration to the cross sectional shape of said flare, and having means associated therewith for moving said flare within said chute from a point of supply to a point of ejection from said chute; said chute element having a relatively fixed actuating projection extending transversely into said bore; said flare including a casing element, a supporting frame within said casing element, a firing pin having a principal axis and slidably mounted by said frame for movement along said axis, firing pin spring means for imparting said movement, a cocking element pivotally mounted upon said casing element for movement between first and second positions, a firing pin release bar pivotally mounted externally of said casing element for movement between first and second positions thereof, said bar having means thereon engaging said firing pin to lock the same against movement when said bar is in said first position, resilient means urging said bar to said second position thereof in which said firing pin is released for movement, said cocking element in said first position overlying said bar to maintain the same in said first position thereof and in a second position moving out of engagement with said bar and compressing said firing pin spring means; said projection engaging said cocking element to move the same from said first position thereof to said second position thereof as said flare is moved along said chute.

8. In combination, an ignitable flare and a dispensing chute therefor, said chute having a through bore corresponding in size and configuration to the cross sectional shape of said flare, and having means associated therewith for moving said flare within said chute from a point of supply to a point of ejection from said chute; said chute element having a relatively fixed actuating projection extending transversely into said bore; said flare including a casing element, a supporting frame within said casing element, a firing pin having a principal axis and slidably mounted by said frame for movement along said axis, firing pin spring means for imparting said movement, a cocking element pivotally mounted upon said casing element for movement between first and second positions, a firing pin release bar pivotally mounted externally of said casing element for movement between first and second positions thereof, said bar having means thereon engaging said firing pin to lock the same against movement when said bar is in said first position, resilient means urging said bar to said second position thereof in which said firing pin is released for movement, said cocking element in said first position overlying said bar to maintain the same in said first position thereof and in a second position moving out of engagement with said bar and compressing said firing pin spring means, and auxiliary means for retaining said bar in said first position thereof irrespectve of the position of said cocking element; said projection engaging said cocking element to move the same from said first position thereof to said second position thereof, and subsequently releasing said auxiliary means as said flare is moved along said chute.

9. In a self-igniting flare, a casing element, resiliently urged firing pin means mounted for movement with respect to said casing element to effect ignition of said flare, firing pin retaining means pivotally mounted on said casing element, firing pin cocking means pivotally mounted on said casing element, said firing pin cocking means in a first position thereof overlying said firing pin retaining means to prevent movement thereof and in a second position thereof being free of the path of movement of said firing pin retaining means and concomitantly cocking said firing pin.

10. In a self-igniting flare, a casing element, resiliently urged firing pin means mounted for movement with respect to said casing element to effect ignition of said flare, firing pin retaining means pivotally mounted on said casing element, firing pin cocking means pivotally mounted on said casing element, said firing pin cocking means in a first position thereof overlying said firing pin retaining means to prevent movement thereof and in a second position thereof being free of the path of movement of said firing pin retaining means and concomitantly cocking said firing pin; percussion cap-supporting means disposed in the line of movement of said firing pin, said firing pin retaining means having means projectable between said pin and said cap-supporting means when in firing pin-retaining position.

No references cited.

BENJAMIN A. BORCHELT, *Primary Examiner.*

SAMUEL FEINBERG, *Examiner.*

S. W. ENGLE, *Assistant Examiner.*